Jan. 5, 1954
W. H. HARSTICK
2,665,060
POWER WASHING CENTRIFUGAL SEPARATOR WITH
INDENTATIONS ALONG THE INNER PERIPHERAL
EDGES OF THE SEPARATING DISKS
Filed July 15, 1950
2 Sheets-Sheet 1
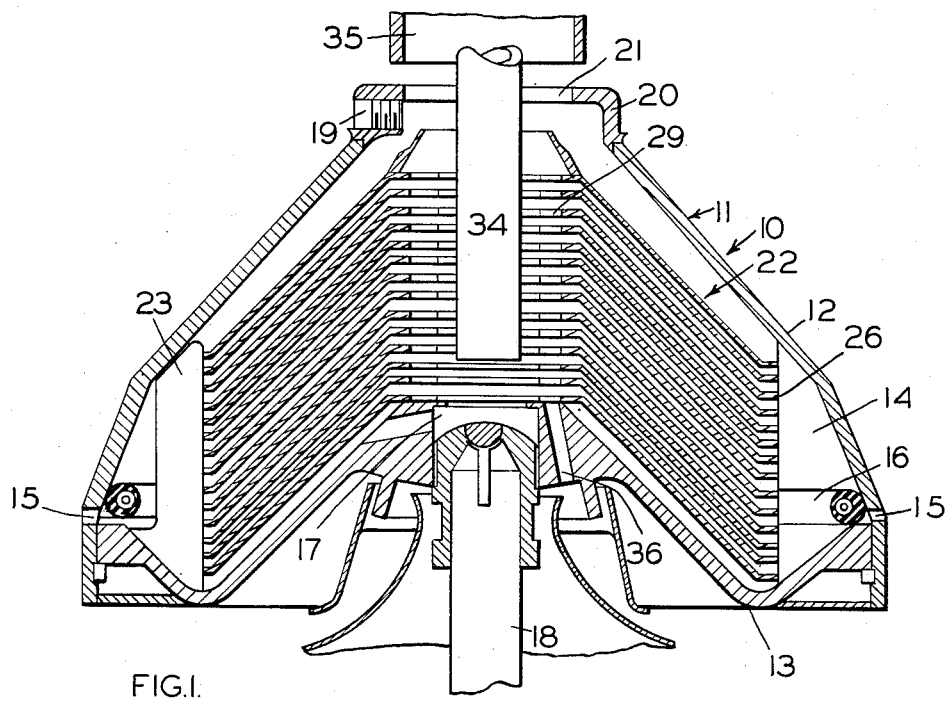
FIG.1.
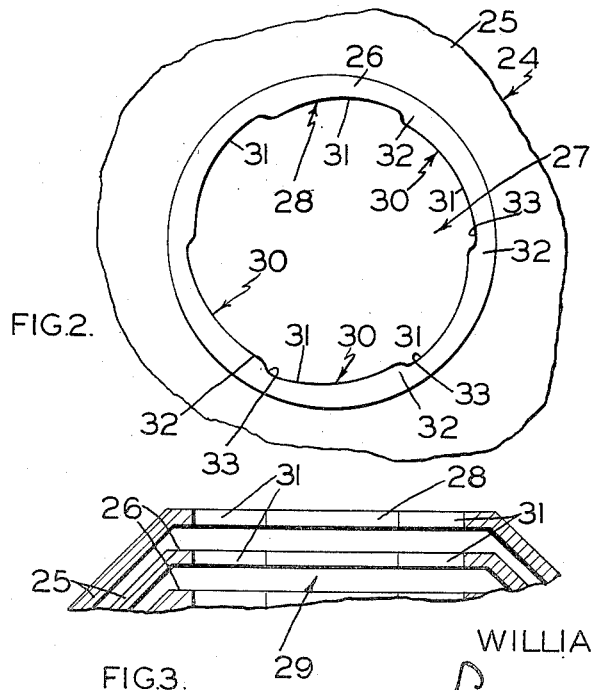
FIG.2.
FIG.3.
INVENTOR
WILLIAM H. HARSTICK
Paul O. Rippel
ATT'Y Jan. 5, 1954 W. H. HARSTICK 2,665,060
POWER WASHING CENTRIFUGAL SEPARATOR WITH
INDENTATIONS ALONG THE INNER PERIPHERAL
EDGES OF THE SEPARATING DISKS
Filed July 15, 1950 2 Sheets-Sheet 2

INVENTOR
WILLIAM H. HARSTICK
Paul O. Pippel
ATT'Y

Patented Jan. 5, 1954

2,665,060

UNITED STATES PATENT OFFICE 2,665,060

POWER WASHING CENTRIFUGAL SEPARATOR WITH INDENTATIONS ALONG THE INNER PERIPHERAL EDGES OF THE SEPARATING DISKS

William H. Harstick, Oak Park, Ill., assignor to International Harvester Company, a corporation of New Jersey Application July 15, 1950, Serial No. 174,109

9 Claims. (Cl. 233—1)

This invention relates to an improved separating bowl of the power washing type. More specifically, the invention relates to an improved separating disk construction used in connection with a cream separator having self-washing and cleaning features of construction.

In applicant's patent for a cream separator, No. 2,504,261 patented April 18, 1950, he has disclosed an improved cream separator bowl having features of construction which permit the operator to wash and clean the separating bowl after each operation without the necessity of dismantling the parts and washing them individually. A power washing cream separator of this type consists of a rotatable bowl having washing liquid discharge ports located at the outer periphery of the bowl. The washing liquid discharge ports are regulated automatically by means of a centrifugally responsive valve member which opens and closes the discharge opening during variations in speed of rotation of the separating bowl.

During the separating operation the bowl is driven generally at a high speed of rotation and the centrifugal valve is operative to maintain the discharge ports in a closed position. After the separating operation has been completed it is desirable to wash the inner parts of the bowl and this is accomplished by reducing the speed of operation and pouring a washing liquid into the bowl. The centrifugal valve means is then operative to open the discharge valves whereupon the washing liquid is flushed from the interior of the bowl. This results in a scouring and cleaning action effective to clean the bowl of retained milk and cream residue. It is generally well-known in the art that the most difficult point of washing is at the inner peripheral edges of the separating disks. The separating disks are each provided with a centrally disposed opening which defines an inner peripheral edge on each disk. The disks are positioned in the bowl in superposed relation in a manner wherein the centrally disposed openings form an axially extending washing liquid receiving space. Washing liquid is then delivered to this space and the centrifugal force is effective to hurl the washing liquid outwardly between the spaced disks.

In order to secure an effective and proper washing it is extremely desirable that a large quantity of washing liquid be delivered to the receiving space since this liquid is generally centrifugally withdrawn from the space immediately by the speed of rotation of the bowl. The disks in effect may be considered for the purpose of washing, as a pump which withdraws the liquid from the receiving space. It can readily be seen therefore that very large quantities of washing liquid are necessary for effecting the washing operation.

A cream separator bowl generally is fed from a supply can which is positioned above the bowl. The supply can is limited as to the quantity of washing liquid which it holds and therefore in order to expedite the washing operation it is desirable to conserve the washing liquid and yet secure an effective and proper washing operation. Since the separating disks normally react as a pumping mechanism it can be seen that with the conventional type of disk it is exceedingly difficult to maintain sufficient washing liquid within the receiving space in a situation where the quantity of washing liquid is necessarily limited. Applicant has provided an improved separating disk that is especially adapted for use with power washing centrifugal separators, the disk being constructed to conserve the amount of washing liquid utilized and yet provide proper washing of the separating disk and the inner surfaces of the bowl.

It is a prime object of applicant's invention to provide an improved separating disk construction for use with a power washing cream separating bowl.

A further important object is to provide an improved construction in separating disks for a power washing separating bowl, the disks each being provided with means at the inner peripheral edges for pushing the liquid delivered to the center holes of the disks inwardly against the action of centrifugal force whereby a high level of washing liquid will build up in the cylindrical receiving space formed by the center holes of the disks, thereby facilitating the washing of the inner edges of the uppermost disks.

Another object is to provide an improved separating disk construction for a power washing separating bowl, the disk including a washing liquid control means constructed to deflect and regulate the washing liquid as it is delivered to the receiving space of the separating bowl.

A still further object is to provide a plurality of superposed separating disks for a power washing separating bowl, the disks each having indentations or cut outs disposed about the inner peripheral edges of the disks, the cut outs being effective to exercise control over the washing liquid delivered to a receiving chamber within the bowl.

Another vital and important object is to provide a plurality of superposed separating disks for a power washing separating bowl, the disks each having cut outs disposed along their inner peripheral edges, the cut outs having lip portions projecting angularly downwardly and providing means for restraining the outward travel of washing liquid delivered to the cylindrical space formed by the inner edges of said disks.

A still further object is to provide a separating disk having a plurality of spirally shaped indentations disposed about the inner peripheral edge of the separating disks.

The novel features of applicant's improvement will become more readily apparent from a reading of the specification when examined in connection with the disclosure of the drawings.

In the drawings:

Fig. 1 shows an elevational view of a centrifugal separator having a separating bowl shown in cross section illustrating features of the invention.

Fig. 2 is a plan view of an improved separating disk showing the novel features of the invention.

Fig. 3 is a side elevational view in section showing a portion of a separating disk pack with the disks positioned in superposed relation.

Figure 4:
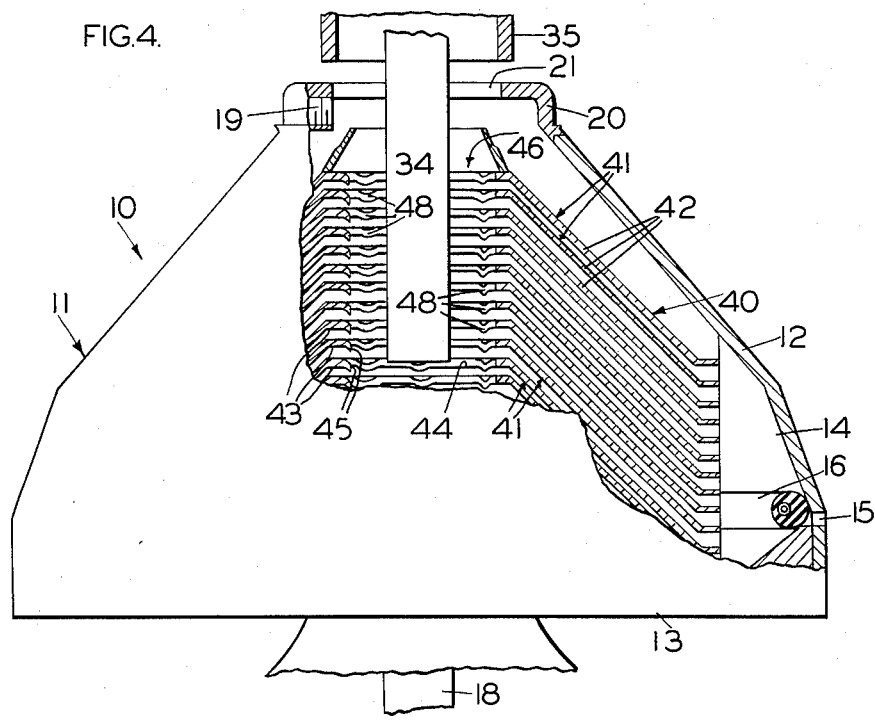
Fig. 4 is a cross sectional view, in elevation, of a modified centrifugal separating bowl for a power washing cream separator.

A centrifugal separator as shown in Fig. 1 is generally designated by the reference character 10. The separator consists essentially of a separating bowl 11 having an upper bowl shell 12 and a lower bowl shell 13 positioned in telescopic assembled relation. The separating bowl 11 is provided with a separating chamber 14. A washing liquid discharge opening 15 is positioned in the maximum periphery of the bowl shell 12. The construction of the washing liquid discharge opening herein disclosed is similar to the disclosure of my Patent 2,473,948, dated January 21, 1949. In that patent the separating bowl disclosed is provided with a substantially continuous washing liquid discharge opening designed to permit the exit of washing liquid during the separating operation. The washing liquid discharge opening 15 is regulated by means of a centrifugal valve structure 16. This centrifugal valve 16, as also shown in the aforementioned patent, may consist of a rubber ring having a spring embedded within the ring. During high speeds of rotation the valve structure 16 is effective to engage and seal the discharge openings 15, this condition taking place during the separating operation.

The separating bowl 11 is provided with a distributor chamber 17 located substantially centrally at the lower portion of the bowl. The distributor chamber 17 is designed to receive whole milk which then is separated within the separating chamber 14. A driving connection 18 is secured to the lower bowl shell 13. The driving connection generally is connected to the shaft (not shown) of a high speed electric motor (not shown).

The skim milk separated within the separating chamber 14 is discharged through a skim milk outlet 19 formed in a collar 20 which is integrally formed at the upper end of the bowl shell 12. The collar 20 is also provided with an entrance opening 21 through which liquid may be delivered to the separating chamber 14.

A disk pack 22 is positioned within the separating chamber 14. The disk pack 22 is supported at its outer peripheral edge on a plurality of wings 23 which extend upwardly in circumferentially spaced relation from the lower bowl shell 13, only one of the wings being shown. The disk pack 22 further includes a plurality of frusto-conical separating disks 24 which are formed with a conical body portion 25. Each disk 24 is provided with a substantially flat horizontal portion 26. Each disk is provided with a substantially centrally located opening 27 extending through the flat surface 26. The opening 27 defines an inner peripheral edge 28 which is continuous and lies wholly within a plane. As best shown in Fig. 1 the separating disks 24 are positioned in superposed relation to provide a central liquid receiving space 29.

Referring particularly to Figs. 2 and 3, the prime feature of the invention is disclosed. Each separating disk 24 is provided with a plurality of cut outs or indentations 30 which are formed or disposed around the inner peripheral edge 28. The cut outs or indentations 30 provide in effect a plurality of circumferentially spaced liquid deflecting edge sections 31. Each liquid deflecting edge section 31 is provided with a first portion 32 which is spaced inwardly a predetermined distance from the axis of the disks. Each edge section 31 further includes a second portion 33 which is spaced a greater distance outwardly from the axis of the disks than the first portion 32. Each section is provided with these portions 32 and 33, and since the edge sections are curved, each indentation is in effect spirally shaped or in effect in a prolate cycloidal manner with respect to the axis of the separating disks. The spiral shape of each indentation 30 is arranged so that the spiral of one indentation extends in the same general direction as the spiral of each other indentation. In other words, the liquid deflecting edge sections 31 are so arranged that each portion 32 of each edge section 31 is positioned immediately adjacent the portion 33 of the next edge section 31. This arrangement is clearly shown in Fig. 2. The separating disks 24 are so positioned within the separating bowl 11 that the cut outs are in direct vertical registry or alignment. Thus the liquid deflecting edges 31 of all the disks are in alignment and function in effect as a baffle during the separating operation in a manner which will presently become more apparent.

The separating bowl 11 is further provided with a milk feed tube 34 which during the separating operation is arranged to deliver whole milk to the distributor chamber 17. During the washing operation the milk feed tube 34 is removed from the receiving space 29 and the washing liquid supply tube 35 is provided to deliver washing liquid to the receiving space 29. A cream outlet 36 is formed in the lower bowl shell 13, the cream outlet being arranged to withdraw cream from the receiving space 29 during the separating operation.

It is believed unnecessary to go into the detailed operation of separation since this is a conventional procedure. During the separating operation whole milk is delivered to the distributor chamber 17 and the separating chamber 14 is effective to separate the whole milk into its proper constituents. During this arrangement the centrifugal valve 16 is effective to close the washing liquid discharge openings 15.

When it is desired to wash the interior parts of the bowl 11 the milk feed tube 34 is removed from the receiving space 29. Washing liquid is then introduced into the receiving space 29 through the washing liquid supply tube 35. The washing liquid enters into the receiving space, and in view of applicant's novel separating disk design the washing liquid within the receiving space is built up as a column within the space whereupon it is thereafter flung outwardly between the spaced separating disks effectively washing the inner peripheral edges and flat surfaces of the disk pack. It has been brought out above that in disks having the normal inner peripheral edge constructions the disks act as a centrifugal pump to immediately withdraw any washing liquid that enters into the receiving space. In effect to a large extent this phenomenon also occurs in applicant's construction. However, the pumping action is clearly reduced by the novel disk construction wherein the inner peripheral edges of the disks are provided with the indentations or cut outs 30.

The disk pack in the bowl is rotating in a clockwise direction. As liquid is supplied to the receiving space the liquid in effect begins to contact the inner peripheral edges of each disk at the portion 33 of the liquid deflecting edge sections 31. For the purpose of description and illustration, let us assume that a drop of liquid contacts a deflecting edge section at the portion 33. Since the bowl is rotating at a fairly high speed of operation there is an immediate force urging the liquid to be flung outwardly between the inner peripheral edges of the disks. By the very nature of applicant's indentations 30 the drop of liquid would travel along the deflecting edge 31 to the portion 32 of the deflecting edge, this portion 32 being spaced a greater distance inwardly to the axis of the disks than the portion 33. The drop of liquid would have a tendency to be deflected toward the axis of the disks thus in effect overcoming to some extent the centrifugal outward throwing action of the liquid by the rotating bowl. As each drop of liquid engages the liquid deflecting edge section it effectively scours the edge. Thus it is possible to effectively clean the inner peripheral edges of the disks with a minimum quantity of washing liquid.

The operation of the indentations has been described by indicating what the effect might be on a drop of liquid as it engages each deflecting edge section 31. Considering that each disk is provided with a plurality of these deflecting edge sections and that these edge sections are multiplied by the number of superimposed disks it can readily be seen that the total effect of all the deflecting edge sections is to create a restraining action on the liquid which tends to offset the centrifugal forces tending to throw the liquid outwardly as a result of rotation. In this manner a very large quantity of washing liquid can be built up within the receiving space 29 despite the fact that the quantity of supply of washing liquid is limited. Thus the indentations or liquid deflecting edges effectively operate to control the washing liquid and to react against the centrifugal force tending at all times to maintain a sufficiently large quantity of washing liquid within the receiving space. In other words, one of the very important functions of the notches is to push the liquid to the center of the cylindrical space, thereby building up a high level of liquid which will be effective for cleaning the uppermost disks as well as the lower disks of the disk pack. Due to the shape of the cut outs it is also apparent that each deflecting edge will be effectively cleaned and washed.

Figure 5:
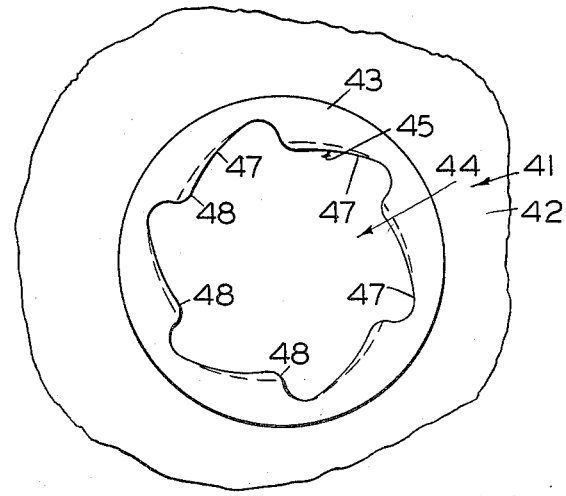
Fig. 5 is a plan view of a center portion of a modified separating disk.

A modified form of the invention is shown in Figs. 4 and 5. The separating bowl per se is identical to the bowl above described and the same reference characters will be utilized, the description above of the bowl also serving to describe the bowl shown in the modification. The modified invention resides in a disk pack 40 which is positioned within the bowl. The disk pack 40 consists of a plurality of frusto-conical separating disks 41, each of which is formed of a conical body portion 42, the disks 41 being positioned in superposed relation. Each disk is also provided with a flat horizontal portion 43 having a central opening 44 defining an inner peripheral edge 45. As best shown in Fig. 4, the openings 44 are aligned to provide a central cylindrical space 46.

Each disk 41 is provided at its inner peripheral edge 45 with a plurality of indentations or cut outs 47. The cut outs are so shaped that each cut out includes a projection or lip 48 which extends inwardly toward the axis of the disks a greater distance than the remainder of the cut out. As best shown in Figs. 4 and 5, the lips 48 are turned angularly downwardly.

The disks 41 like the disks 24 are provided with indentations or cut outs, the cut outs being effective to force the liquid inwardly toward the center of the disk pack. In addition, the disks 41 are provided with lips 48 which project inwardly toward the axis of the disks and are turned downwardly angularly. This shaping of the lips 48 increases the restraining action of the disks to keep the liquid in the cylindrical space so that all of the inner peripheral edges of the disks receive proper washing with a minimum amount of washing liquid necessary.

The novel construction of the separating disks is effective to produce complete scouring and washing of the inner peripheral edges of the disks as well as the inner parts of the separating bowl without the utilization of large quantities of washing liquid. It is of course contemplated by applicant that certain set-ups may be provided wherein the quantity of washing liquid used is immaterial. Such may be the case where a direct pipe line extends to the separating bowl and the operator may have access to large reservoirs of washing liquid. In a case of this type it might be desirable to reverse the operation and to drive the bowl in a counter-clockwise direction. For this purpose a reversible electric motor may be utilized in connection with the bowl. In the utilization of such an arrangement it is readily apparent that the cut outs or indentations of the disks will work in an entirely opposite manner tending to speed up the effect of the liquid as it enters into the receiving chamber. Since the washing liquid in a situation of this type may be unlimited, such speed up may be exceedingly desirable to wash the more remote or outer surface of the separating chamber. Applicant contemplates this type of use, though in effect he is primarily concerned with providing a novel control means for conserving the amount of washing liquid utilized in a power wash cream separating bowl.

It must be understood that changes and modifications may be made in this construction without departing from the spirit of the invention as disclosed nor the scope thereof as defined in the appended claims.

What is claimed is:

1. A separating disk for a power washing centrifugal separator comprising a frusto-conical body, a horizontal portion at the upper end of said body, said horizontal portion having an opening providing an inner peripheral edge, a plurality of indentations formed in said edge providing a plurality of circumferentially spaced edge sections, each edge section extending spirally with respect to the axis of the disk and in the same direction to provide a plurality of liquid engaging portions.

2. A rotatable separating disk for a power washing centrifugal separator comprising a smooth frusto-conical body, a flat horizontal portion at the upper end of said body, said flat horizontal portion having an opening through the body providing an inner axially extending peripheral edge disposed wholly within a plane, a plurality of circumferentially spaced indentations in said edge providing a plurality of spirally shaped liquid engaging and deflecting edge sections, each edge section having a first portion spaced a distance from the axis of the disk and a second portion spaced a greater distance from the axis of the disk than said first portion.

3. A rotatable separating disk for a power washing centrifugal separator comprising a frusto-conical body having a substantially flat horizontal portion extending across one end of the body, said flat portion having an opening extending through the flat portion, the opening defining an inner peripheral edge lying wholly within a plane, a plurality of circumferentially spaced spirally shaped indentations in the peripheral edge, each indentation having a first portion spaced from the axis of the disks and a second portion spaced a greater distance from the axis of the disk than said first portion, and a curved edge section connecting said first and second portions, the first portion of one indentation being positioned immediately adjacent the second portion of another indentation about the inner peripheral edge.

4. A rotatable separating disk for a power washing cream separator comprising a frusto-conical body having a substantially horizontal flat portion extending across one end of the body, said horizontal flat portion having an opening extending therethrough, the opening defining an inner peripheral edge lying wholly within a plane, a plurality of spirally shaped indentations in the peripheral edge, each indentation having a first portion spaced from the axis of the disks and a second portion spaced a greater distance from the axis of the disk than said first portion, and a liquid engaging edge section connecting said first and second portions, the first portion of one indentation being circumferentially spaced from the first portion of the second indentation by the length of each liquid engaging edge section.

5. A disk pack for a rotatable power washing centrifugal bowl comprising a plurality of frusto-conical separating disks disposed in spaced superposed relation, each of said disks a flat horizontal annular portion having a central opening defining an inner peripheral edge, the inner peripheral edges of said disks being in vertical registry to provide a cylindrical liquid receiving space, and each disk having a plurality of indentations extending spirally with respect to the axis of rotation of the disk and being circumferentially spaced about its inner peripheral edge, the indentations of each disk being disposed in registry with respect to the indentations of each other disk to provide a plurality of circumferentially spaced vertically aligned liquid deflecting edge sections each liquid deflecting edge section having one end spaced a greater distance from the axis of the disks than the opposite end of said edge section and all of the deflecting edge sections of each disk lying within a plane.

6. A centrifugal separator comprising a rotatable bowl having a washing liquid discharge opening disposed in a peripheral portion of the bowl, valve means for regulating the discharge of washing liquid through said discharge opening, a plurality of separating disks disposed in said bowl in spaced superposed relation, each disk having an annular flat horizontal portion provided with a centrally disposed opening defining an inner peripheral edge lying wholly within a plane, the openings being in vertical registry to provide a liquid receiving space, each disk having a plurality of spirally shaped indentations circumferentially disposed about its inner peripheral edge, each indentation having an edge section provided with a first portion spaced a distance from the axis of the disk and a second portion spaced a greater distance from the axis of the disks than said first portion, the indentations of said disks being in vertical alignment.

7. A centrifugal separator comprising a rotatable bowl having a washing liquid discharge opening disposed in a peripheral portion of the bowl, valve means for regulating the discharge of washing liquid through said discharge opening, a plurality of separating disks disposed in said bowl in spaced superposed relation, each disk having a centrally disposed opening defining an inner peripheral edge, the openings being in vertical registry to provide a liquid receiving space, each disk having a plurality of cut outs circumferentially disposed about its inner peripheral edge, each cut out having a deflecting edge section extending spirally with respect to the axis of rotation of said disks, the deflecting edge sections being arranged and constructed to control the discharge of washing liquid from the receiving space to the separating disks.

8. A rotatable separating disk for a power washing centrifugal separator comprising a frusto-conical body, a horizontal portion at the upper end of said body, said horizontal portion having an opening through the body providing an inner peripheral edge, a plurality of circumferentially spaced indentations in said edge providing a plurality of edge sections, each edge section having a first portion spaced a distance from the axis of the disk and a second portion spaced a greater distance from the axis of the disk than said first portion, the first portion of each edge section being bent angularly with respect to the horizontal portion of said body.

9. A rotatable separating disk for a power washing centrifugal separator comprising a frusto-conical body having a substantially flat portion extending across one end of the body, said flat portion having an opening extending through the flat portion, the opening defining an inner peripheral edge, a plurality of circumferentially spaced indentations in the peripheral edge, each indentation having a first portion forming a lip spaced from the axis of the disks and a second portion spaced a greater distance from the axis of the disk than said first portion, and a curved edge section connecting said first lip and said second portion, the lip portion projecting angularly with respect to the flat portion of the disk.

WILLIAM H. HARSTICK.

References Cited in the file of this patent

UNITED STATES PATENTS

| Number | Name | Date |
|---|---|---|
| 1,160,674 | Leitch | Nov. 16, 1915 |
| 1,365,643 | Andersson | Jan. 18, 1924 |
| 2,173,579 | Fawcett | Sept. 19, 1939 |